United States Patent [19]
Nobileau

[11] Patent Number: 5,337,823
[45] Date of Patent: Aug. 16, 1994

[54] PREFORM, APPARATUS, AND METHODS FOR CASING AND/OR LINING A CYLINDRICAL VOLUME

[76] Inventor: Philippe C. Nobileau, 410 Avenue des Roches Rouges, 83530 Agay, France

[21] Appl. No.: 946,423
[22] PCT Filed: May 21, 1991
[86] PCT No.: PCT/FR91/00407
§ 371 Date: Nov. 6, 1992
§ 102(e) Date: Nov. 6, 1992
[87] PCT Pub. No.: WO91/18180
PCT Pub. Date: Nov. 28, 1991

[30] Foreign Application Priority Data

May 18, 1990 [FR] France ................. 90 06269
Oct. 22, 1990 [FR] France ................. 90 13053
Jan. 21, 1991 [FR] France ................. 91 00628

[51] Int. Cl.⁵ .......................................... E21B 7/00
[52] U.S. Cl. .......................................... 166/277
[58] Field of Search ............ 166/277, 179, 185, 195

[56] References Cited

U.S. PATENT DOCUMENTS

| | | |
|---|---|---|
| 1,641,035 | 8/1927 | Hero . |
| 3,130,787 | 4/1964 | Mason . |
| 3,203,483 | 8/1965 | Vincent . |
| 3,354,955 | 11/1967 | Berry .................. 166/277 |
| 3,419,080 | 12/1968 | Le Bourg . |
| 3,489,220 | 1/1970 | Kinley ................. 166/277 |
| 3,493,045 | 2/1970 | Bassani . |
| 3,719,230 | 3/1979 | Kemp . |
| 3,865,188 | 2/1975 | Doggett . |
| 4,349,204 | 9/1982 | Malone . |
| 4,714,117 | 12/1987 | Dech . |
| 5,083,608 | 1/1992 | Abdrakhmanov et al. .... 166/277 X |

FOREIGN PATENT DOCUMENTS 1189492 3/1965 Fed. Rep. of Germany .
1586 9/1969 African Int. Prop. O. .

Primary Examiner—Thuy M. Bui

[57] ABSTRACT

According to the invention, the tubular preform is radially deformable between a longitudinally folded state and substantially cylindrical unfolded state to form a length of rigid tube in situ. The preform comprises a flexible and watertight inner envelope (6) whose peripheral extent is equal to the internal extent of the length of tube, and, formed on the outside of said inner envelope, reinforcement (2) made of filamentary structure comprising a plurality of fibers impregnated with a settable resin, including fibers (3) oriented mainly in the peripheral direction of the preform, each of these fibers (3) extending over more than one turn and co-operating with adjacent fibers by making contact therewith such that adjacent fibers can slide over one another while the preform is in any state other than its unfolded state where, under internal pressure, the fibers are locked together by the friction between them due to a capstan effect.

34 Claims, 6 Drawing Sheets

Fig. 2
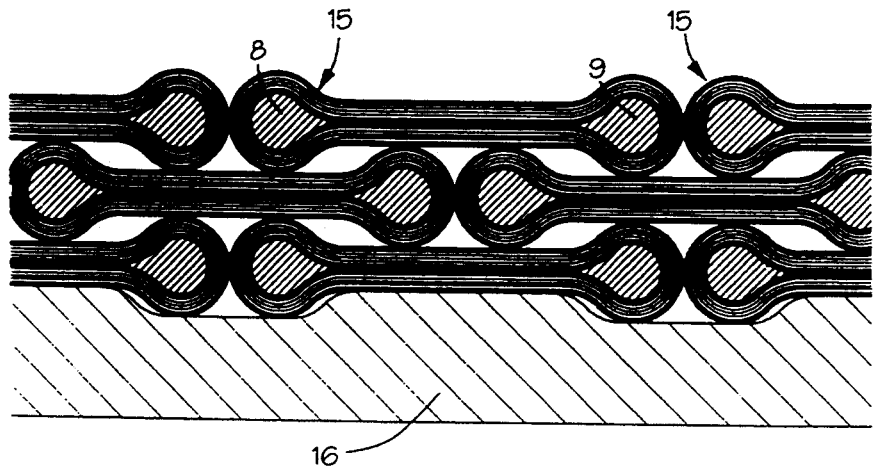
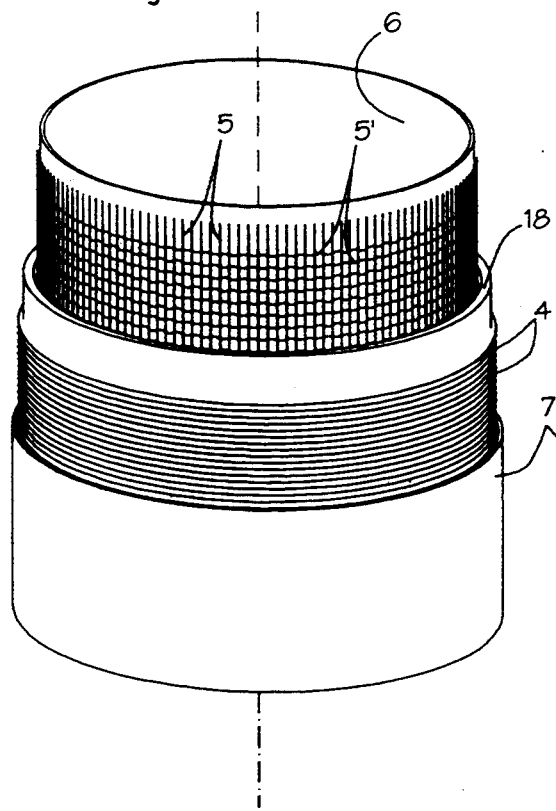
Fig. 3A
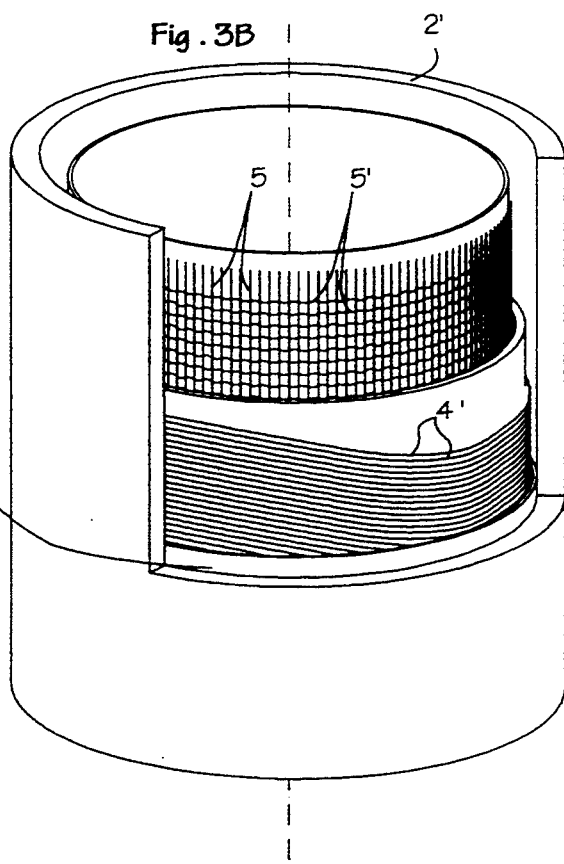
Fig. 3B

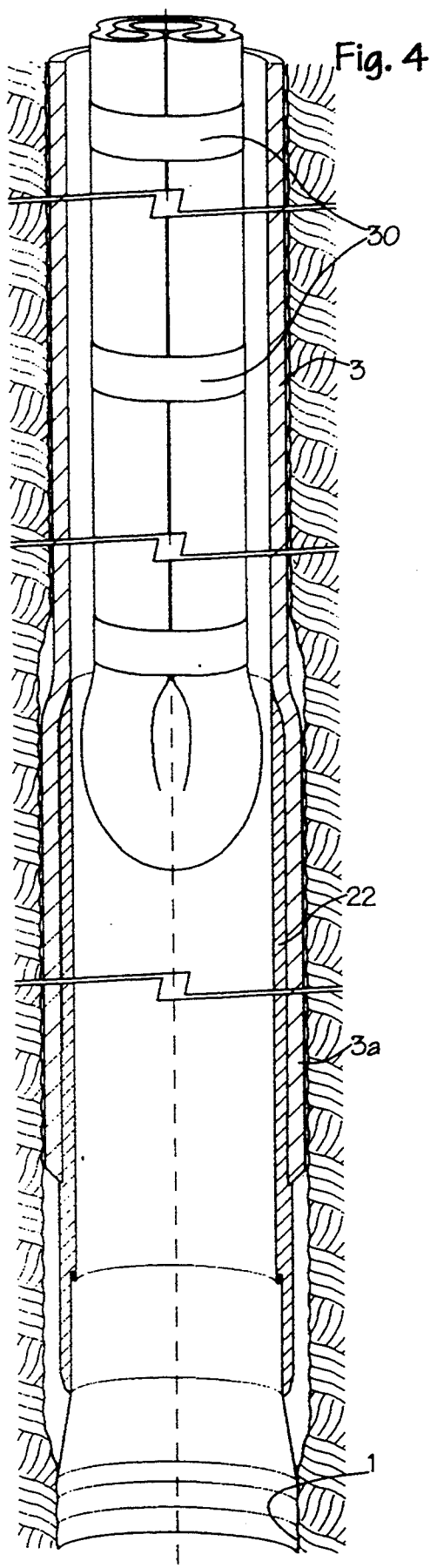
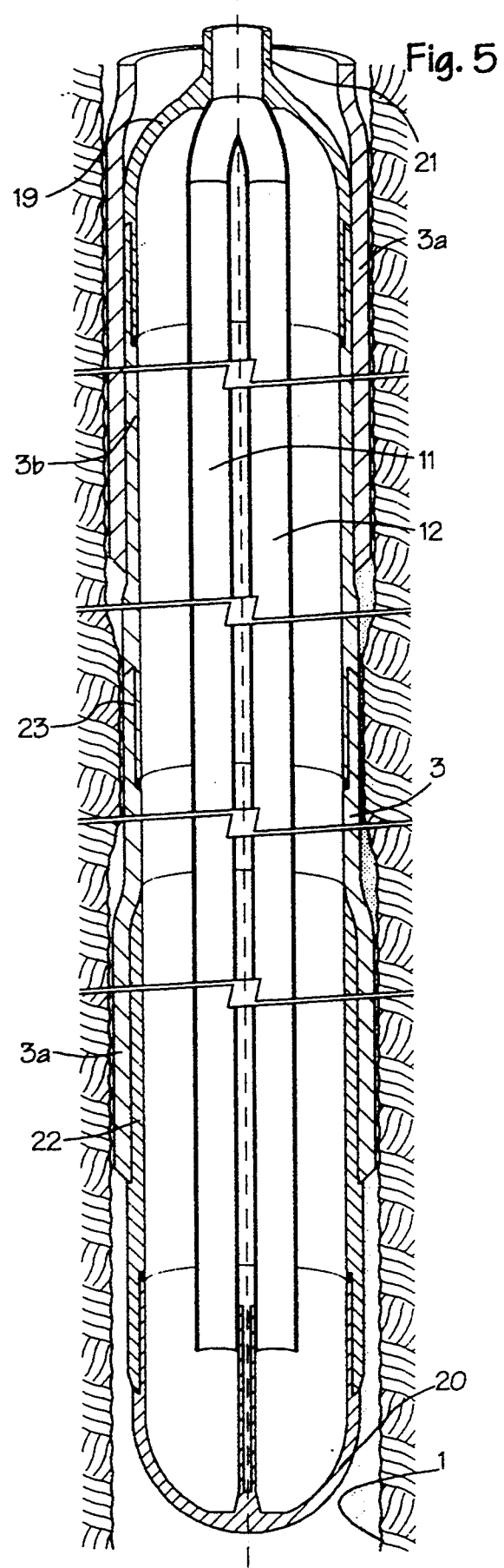
Fig. 4
Fig. 5

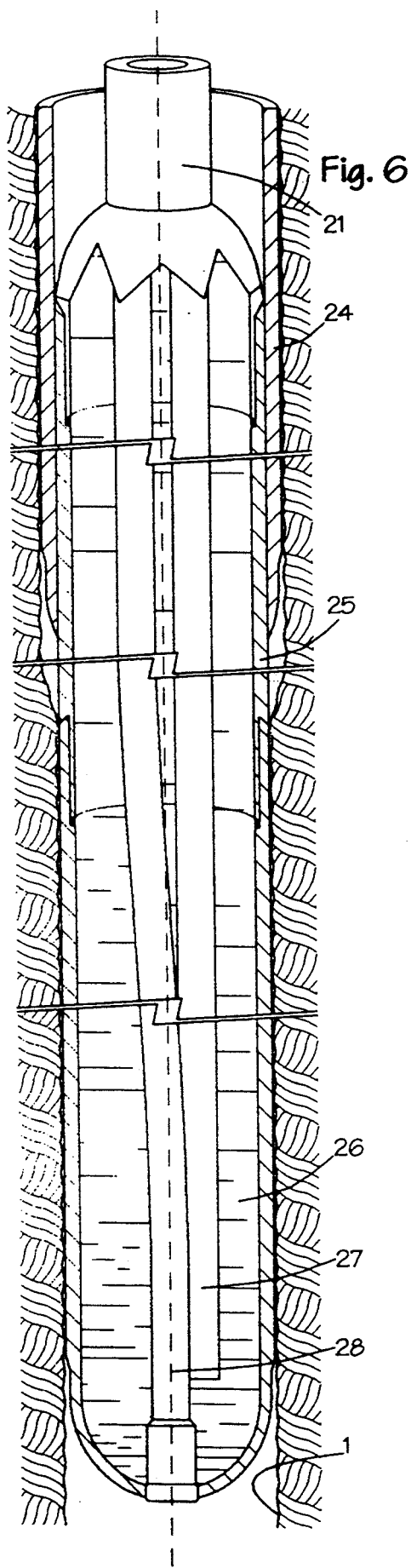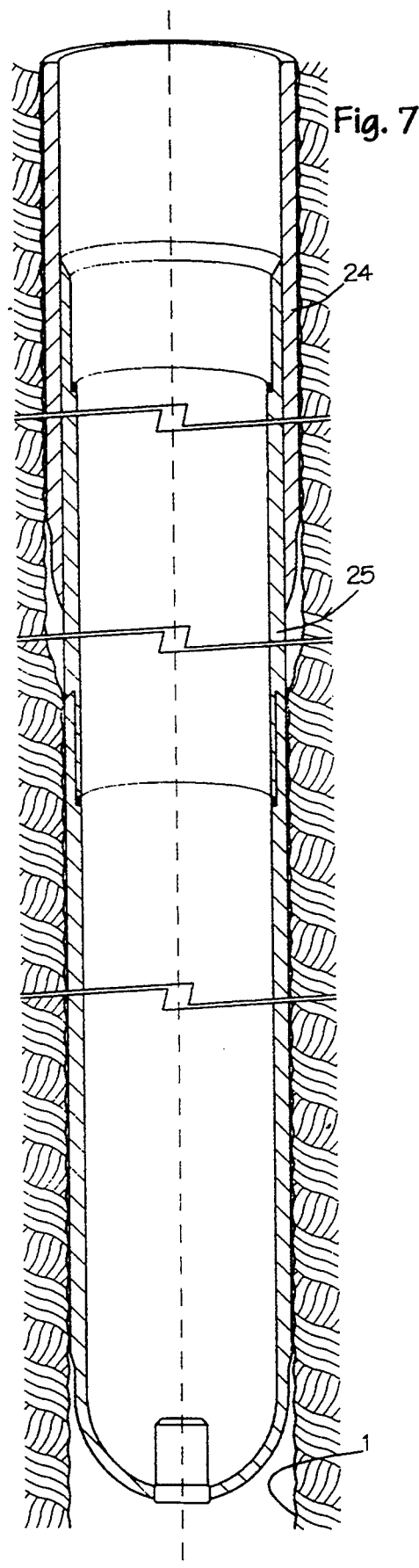

PREFORM, APPARATUS, AND METHODS FOR CASING AND/OR LINING A CYLINDRICAL VOLUME

The invention relates to apparatuses and methods for making a tube in situ from a folded preform that is easier to handle and install than are lengths of rigid tube.

BACKGROUND OF THE INVENTION

There are several applications that require tubes to be made and used on site. One such application is casing boreholes, in particular in the oil industry; a second is making ducting of great length such as submarine pipelines, and finally another consists in restoring or lining buried pipelines or casing.

The purpose of a borehole, in particular an oil exploration borehole, is to establish a passage for communication between the surface and an objective underground. For most wells, the initial diameter of the bore is large, whereas once the well is completed, the final communication passage is of small diameter: usually less than 6" (152 mm). The passage is then of constant diameter equal to this small final diameter up the entire height of the well.

To establish such communication while withstanding the pressures encountered, longer and longer successive concentric lengths of casing are lowered and suspended from the surface and are then cemented in place. Given that each length of casing must pass through the preceding length, its outside diameter must be less than the inside diameter of the preceding length, and to obtain a final access diameter of 4" to 8" (102 mm to 203 mm), it is necessary to begin with a borehole of large diameter, in particular 17½" (445 mm), and even 36" and 26" (915 mm and 660 ram) for offshore boreholes.

Present methods thus require an initial hole of large diameter to be drilled in order to have a sufficient number of lengths of casing available for making the well. The direct consequences of this technique are that the time required for drilling is long and consumables (steel tubes, drilling mud, sealing cement, etc . . . ) are needed in large quantities. In addition, because the initial lengths of casing are of large diameter, their wall thicknesses are limited for reasons of weight. The capacity of such initial lengths of casing to withstand high internal pressures is therefore limited. It is necessary for each following inner tube to be suspended from the surface in order to increase the ability of the top portion of the casing to withstand the high pressures that obtain at the bottom of the well.

In addition to the large quantity of consumables, and the long time required by said operations of drilling and installing concentric casing, present techniques suffer from other drawbacks. Cementing is difficult to perform because of the narrowness of the annular space and the hazards of the terrain drilled through. In addition, the fact that the casing is made of metal constitutes an obstacle to performing various measurements, in particular electrical measurements, that are required for locating productive layers for the future purpose of putting the hydrocarbon reserves into production.

There thus exists a need to simplify the operations of drilling and of casing.

In addition, it is difficult and lengthy to install pipework, in particular offshore and in particular when of relatively large diameter, because of the need for a plurality of lengths of steel tube that make up the pipework to be interconnected end-to-end, generally by welding, and for said pipework to be paid out progressively from the vessel on which it is assembled while it is being assembled and without kinking it, thereby giving rise to high tensions during laying. There is also a need to make the laying of such pipework easier, particularly in deep water and/or if the pipework is large in diameter.

Finally, restoring or lining underground casing or pipework implies that an inner lining must be installed in a faulty pipe (that has become porous or unsealed when lengths are connected together), said lining being capable, at least in some locations, of replacing the pipework itself which may have completely disappeared due to corrosion.

The present invention seeks to satisfy these needs by making it possible when applied to a borehole to retain a small drilling diameter over the entire length of the well together with small diameter casing. When applied to making offshore pipework, the invention enables the pipework to be installed while flat, thereby reducing the minimum acceptable radius of curvature during laying and consequently reducing tension during laying; and when applied to repairing faulty pipework, the function of the preform is to consolidate the pipework and sometimes even to take its place. These results are obtained by using a deformable and settable composite material of minimum radial size prior to setting and possessing a structure that enables it to be folded into its minimum-size state and to be radially inextensible even before setting so as to enable it to take up its final shape even in the absence of any outside restraint.

SUMMARY OF THE INVENTION

To this end, in a first aspect, the present invention provides a tubular preform that is radially deformable between a longitudinally folded state and a substantially cylindrical unfolded state to form a length of rigid tube in situ, the preform comprising a flexible and watertight inner envelope whose peripheral extent is equal to the internal extent of the length of tube, and, formed on the outside of said inner envelope, reinforcement made of a filamentary structure comprising a plurality of fibers impregnated with a settable resin, including fibers oriented mainly in the peripheral direction of the preform, each of these fibers extending over more than one turn and co-operating with adjacent fibers by making contact therewith such that adjacent fibers can slide over one another while the preform is in any state other than its unfolded state where, under internal pressure, the fibers are locked together by the friction between them due to a capstan effect.

This structure allows the preform to be "folded" lengthwise even though it has a thick wall, while nevertheless avoiding unacceptable bending stresses in said wall or needing to use materials that are very resilient and which as a result do not possess the mechanical characteristics required for making a tube that can withstand high pressures.

For example, a polymerized composite wall, i.e. in which the reinforcing fibers are held in place relative to one another within a rigid matrix, can achieve a radius of curvature of less than 20 mm elastically only if its thickness is less than 5/10-ths of a millimeter. A thick wall in the meaning of the invention is thus a wall whose thickness is greater than 5/10-ths of a millimeter since the smallest radius of curvature that will be required in applications of the invention is about 20 millimeters.

Such folding is made possibly only because the filamentary structure constituting the reinforcement of the tube includes elements that are capable of sliding relative to one another in the matrix while in its initial, fluid state. The term "filamentary structure" should be understood as meaning a structure including threads of synthetic material, or of metal in certain applications, which may be woven or collected together in rovings wound to form the wall of the tube, having one or more layers, and having determined crossing angles. The main characteristic of this structure lies in the presence of a large number of circumferential threads such that the structure is practically inextensible in the circumferential direction under the effect of a given internal pressure because of the mutual friction between the circumferential threads (capstan effect) which locks them together.

In a first embodiment, the filamentary structure is constituted by a plurality of long fibers impregnated with settable resin wound onto the inner envelope while supported by a mandrel and covered with sheets of longitudinal fibers.

In another embodiment, the filamentary structure comprises a plurality of concentric sleeves placed one within another, each of the sleeves having a determined peripheral size under load that is slightly greater than the size of the sleeve that it surrounds or slightly smaller than the size of the sleeve which surrounds it, thereby forming a compact structure.

In another embodiment, for applications where it is important for the minimum weight of the preform to be high, for example for ensuring that submarine pipework is stable, the filamentary winding may advantageously be constituted entirely or partially of metal wires of small section (about 1/10 mm).

The preform of the invention preferably also includes a flexible watertight outer envelope whose peripheral size is equal to the outside size of the length of tube, with the reinforcement being confined between the two envelopes.

Each length of flexible preform includes a flexible end wall connected in watertight manner to one of the ends of the tubular wall, and at the opposite end it includes a second flexible end wall having a filler duct for filling the tubular section passing therethrough, which duct is connected to a source of fluid for causing the preform to take up a cylindrical state starting from a folded state in which its inside volume is isolated from the outside or is even kept evacuated. The preform finished off in this way is ready for hydraulic testing in the factory prior to being stored folded under a vacuum and on a transport drum. The vacuum maintained inside the preform stiffens the folded preform and keeps it at a constant volume, and thus at a constant buoyancy while the length is being immersed in a fluid, and in spite of variations in the hydrostatic pressure of the surrounding liquid.

In a variant embodiment, the wall of the preform may include a thick layer or core sandwiched between two pluralities of filamentary windings for the purpose of withstanding transverse compression and sufficiently flexible to be suitable for folding, thereby increasing the second moment of area of the tubular section. In some cases, the core could be made of a material of high density in order to increase the weight of the length of flexible preform. It is also possible to provide a core constituted by winding thin impregnated foils capable of sliding relative to one another so as to facilitate radial folding and which are subsequently prevented from sliding by the impregnating resin setting.

In the folded state, the preform has its wall flattened against itself, and the longitudinal edges thereof form hairpin bends around respective volumes filled with incompressible material that is semi-solid at ambient temperature, limiting the radius of curvature of the fold. In some cases, the material is also of high density, achieved by using a mineral filler, thereby increasing the mass of the length and making it easier to sink in a liquid medium. All or part of this material may be replaced by tubular ducts whose role is explained below, which ducts constitute elements that limit the radius of curvature of the wall of the preform.

Depending on the purpose of the preform: making pipework, casing a borehole, etc . . . , the preform is presented in the folded state either in the form of a substantially flat strip or else in the form of a horseshoe, with the two hairpin bends being adjacent to each other. In the horseshoe configuration, the overall radial dimensions of the preform are smaller than the inside diameter of the preform in its unfolded state.

Advantageously, the space inside the horseshoe constitutes a housing for material in the plastic state for use in making a watertight bond between the wall of the tube obtained by unfolding and hardening the preform and the ground it passes through when the invention is used for casing a borehole, particularly in the oil industry.

The length of preform and sealant are contained in an elastic envelope whose peripheral size at rest is substantially equal to the outside peripheral size of the preform in the unfolded state.

In the event that it is desirable for the casing to have a single inside diameter and simultaneously for there to be a sealing overlap between two successive lengths, the end of the length of preform furthest from the end through which the filler duct passes has an inside diameter in the unfolded state which is equal to the outside diameter of its other end, over portions of substantially equal length.

Advantageously, to enable the casing to be filled progressively from the bottom upwards, the filler duct extends inside the length of preform to the vicinity of the opposite end wall. More precisely, this duct may be split into two branches extending parallel to each other in each of the volumes filled with the above-mentioned incompressible material and constituted by the above-mentioned tubes for limiting curvature, with the walls of these tubes being connected at least in part to the end wall of the length of preform so as to constitute the means for extracting said end wall after the sealant and the preform wall have set.

To ensure that filling takes place progressively from the bottom upwards, a plurality of bands are disposed at intervals along the casing and they break one after another as filling takes place. This avoids any risk of uncontrolled filling that could leave a poorly filled and thus non-cylindrical neck between two portions each inflated to the nominal diameter.

The invention also provides a method of casing a borehole using the above apparatus, which method comprises the following steps:

(a) drilling a portion of borehole to a diameter substantially equal to the outside diameter of the casing;

(b) lowering the section of folded flexible preform inside the borehole and/or the previously installed casing, and than when substantially the entire length of said section of folded flexible preform is received beyond the bottom portion of the previously installed casing, filling it with a fluid to cause it to take up its cylindrical state, starting from the bottom;

(c) allowing setting to take place of the matrix impregnating the filamentary structure which is tensioned by the internal filling pressure; and (d) raising the filling duct.

To provide sealing between two successive lengths, the method of the invention may include the following steps:

(a) drilling a portion of borehole to a diameter substantially equal to the outside diameter of the casing;

(b) lowering the flexible preform section in its folded state inside the previously installed casing and stopping the descent of the folded preform section so that the top portion of the preform remains received inside the previously installed portion of casing whose inside diameter is equal to the outside diameter of the top portion of the preform;

(c) filling the preform to take it from its folded state to its cylindrical state, starting from its bottom end;

(d) allowing setting to take place of the matrix impregnating the filamentary structure which is tensioned by the internal filling pressure; and (e) raising the filling duct.

In a variant embodiment, the preform of the invention is closed at both ends and in its folded, first state its maximum outside radial size is less than its inside diameter achieved when in an unfolded, second state, and it possesses at least one flow duct which extends axially inside the preform and which passes in sealed manner through its closed ends, means existing for connecting the inside volume of the preform to a source of fluid to cause it to pass from its first state to its second state by being inflated. The flow duct serves to cause a cement slurry to flow in the annular space that exists between the borehole and the preform lowered down the borehole, whether it has been unfolded or not. In this variant embodiment, no sealant is carried by the preform.

In a first embodiment, the means for connecting the preform to a source of filler fluid is constituted by a separate duct connecting the inside volume of the preform to the source.

In another embodiment, said connection means is constituted by a branch on the flow duct and connected thereto via a conventional branch coupling sleeve situated in the vicinity of the top of the preform. In both cases the flow duct and the inflation duct are advantageously constituted by pipes received in the preform and serving to limit the radius of curvature of its wall.

The preform may also include a diaphragm splitting its inside volume into two superposed volumes, one of which is shorter than the other.

The end of the longer volume that is further from the other volume possesses a portion whose length is not less than the length of said other volume and whose inside diameter is substantially equal to the outside diameter of said other volume when they are both in their second state.

Each of the volumes is fitted with independent means connecting it to a source of fluid under pressure.

The diaphragm is breakable beyond a pressure threshold.

In addition, the said flow duct includes a cementing non-return valve preventing fluid returning towards the source, said valve being made of drillable materials, and there exists a disconnection zone situated inside the section of flexible casing close to one of its ends.

Finally, it should be observed that the cement may be caused to flow when the preform is still in the folded state. Under such circumstances, provision is made to inflate or fill the preform and/or each of its compartments from the bottom upwards so that inflation causes the cement to be expelled upwards along the borehole since that is the only direction from which it can be removed.

The invention also provides another method of casing a borehole using the above cement-flow apparatus, the method comprising the following steps:

(a) drilling a portion of borehole having a diameter substantially equal to the outside diameter of the casing;

(b) lowering the section of flexible preform in its folded state down the previously installed casing and stopping descent of the folded section of preform so that the top portion of the preform remains received in the previously installed portion of casing which has an inside diameter equal to the outside diameter of the top portion of the preform;

(c) causing a cement slurry to flow via the flow duct so that the slurry rises up the annular space between the folded section of preform and the wall of the borehole;

(f) filling the section of preform from the bottom with a fluid for taking said section of preform to its second state;

(g) allowing the cement slurry and the preform to set, thereby sealing the casing made in this way in watertight manner to the wall of the borehole; and (h) detaching and raising the flow duct.

Other advantages and characteristics of the invention appear from the following description of embodiments of the invention given by way of non-limiting example and shown in the accompanying drawings, in which:

BRIEF DESCRIPTION OF THE DRAWINGS

FIG. 2 is a diagrammatic view of a flattened configuration of the preform disposed in successive layers on a drum;

FIG. 3A is a diagrammatic perspective view of the structure of one embodiment of the wall of a length of casing of the invention in its cylindrical state;

FIG. 3B is a diagrammatic perspective view of the structure of the same embodiment of the wall of a length of casing in its cylindrical state when said structure is pressed firmly against the inside of existing casing for the purpose of lining it;

FIG. 4 is a diagrammatic vertical section through the end of a section of casing after it has been installed and also showing a section of casing being lowered in its folded state;

FIG. 5 is a diagrammatic vertical section through a section of casing in its cylindrical state after it has been filled;

FIG. 6 is a vertical section through a second embodiment of successive concentric lengths of casing in a borehole cased in accordance with the invention after the casing has been filled;

FIG. 7 shows the cased borehole of FIG. 6 after the preform and the sealant have been put into place and after the filler endpiece has been removed;

DETAILED DESCRIPTION OF THE INVENTION

Figure 1A:
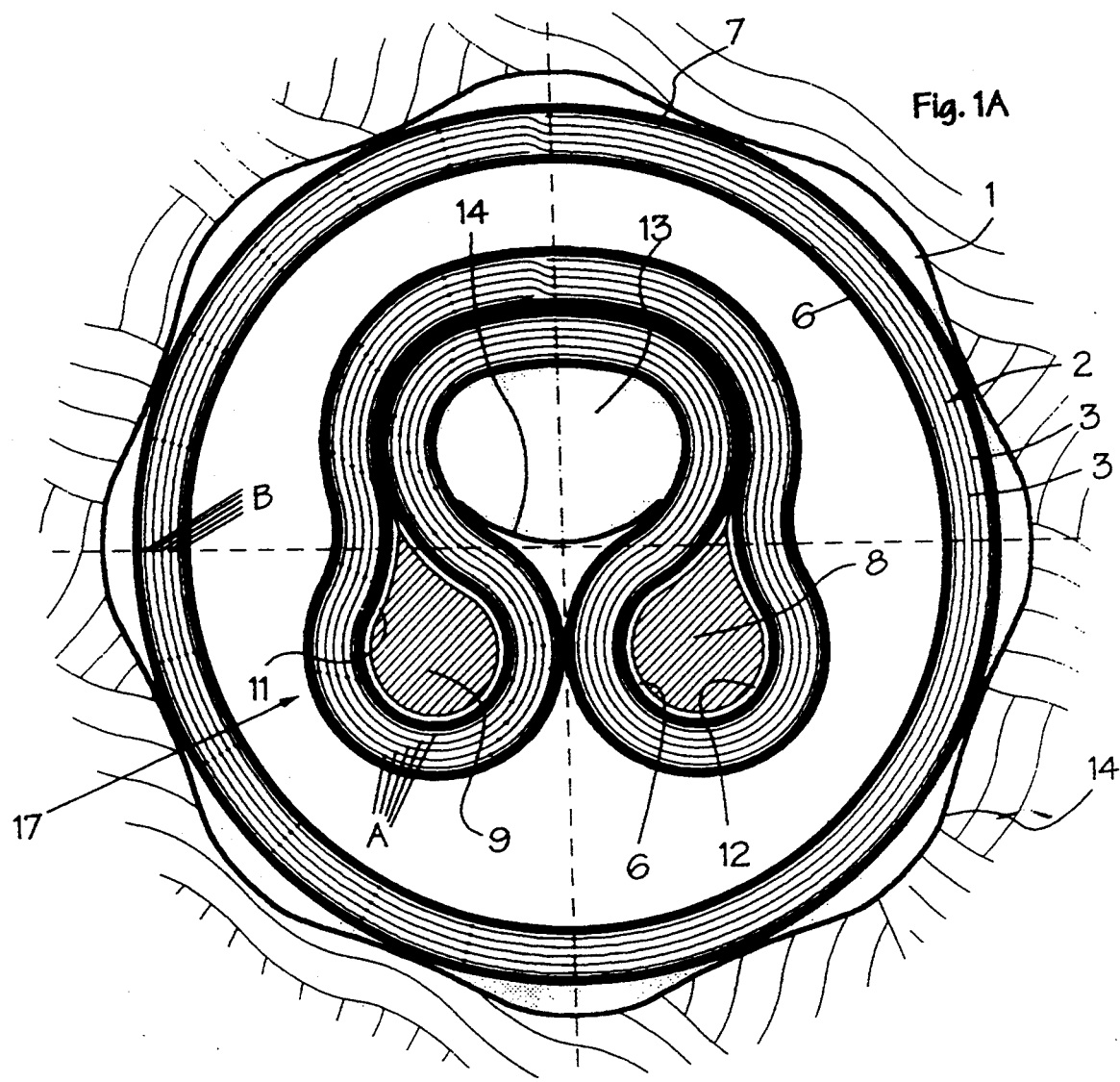
FIG. 1A is a diagrammatic cross-section through a borehole showing a section of preform in the folded state being lowered inside a section of casing that has previously been installed.

In FIGS. 1A and 4 to 7, there can be seen a borehole 1 provided with casing 2 in accordance with the invention, i.e. made of a composite material that has become rigid by the matrix impregnating its filamentary structure setting, either by polymerization or by setting under the effect of heat from the borehole or from a flow of hot fluid, or finally by putting a hardener into contact with the impregnating resin.

The wall of this casing is thick in the sense used in the present invention, i.e. once polymerized it cannot take up a radius of curvature of less than 40 mm elastically.

The filamentary structure of this wall is very special. It possesses, between an inner skin and an outer skin, a plurality of fibers whose main orientation is circumferential (or peripheral) so as to be good for withstanding a high internal pressure, said fibers also being capable of sliding relative to one another in the circumferential direction so that said thick wall is capable of being folded while avoiding unacceptable traction and bending stresses being applied to certain fibers in the wall which would otherwise happen if the fibers were prevented from sliding longitudinally relative to one another.

It is also necessary, once the structure had reached its unfolded size, for the fibers to be prevented from moving relative to one another so that the structure is radially inextensible under the effect of internal pressure. This feature of inextensibility must be obtained before the resin sets since setting is solely to ensure that the structure remains in its unfolded state, i.e. setting does not contribute to withstanding internal pressure. The purpose of setting the resin is essentially to prevent the structure from buckling under the effect of external pressure, with its shear strength that prevents the fibers from sliding relative to one another being satisfactory. The fibers are mutually locked together by the friction that develops between each fiber and the adjacent fibers along a line of contact that is long enough for a capstan effect to be produced. This effect exists so long as each of the fibers that is oriented mainly circumferentially occupies at least one turn, and preferably occupies a plurality of turns.

There are several ways in which a filamentary structure possessing these characteristics can be made. One such way is illustrated in FIG. 3A and it consists in winding long fiber rovings 4 that are preimpregnated with resin onto a mandrel that has previously been covered with an envelope 6 that is flexible and watertight, the thickness to which the rovings are wound being defined by the difference in diameter between the inside envelope 6 and an outside envelope 7 that is also flexible and watertight and which covers the winding made in this way, thereby retaining dimensional uniformity (thickness) along the entire structure. It is preferable to install a sheet of longitudinal fibers 5 woven with filaments 5' between the inside envelope 6 and the winding 4 so as to enable the preform to withstand longitudinal stresses that result from its weight and from pressure being applied to its ends. If it is necessary for the preform to have some minimum weight, for example to ensure that it sinks in a mud of high density, then some or all of the synthetic fibers may be replaced by steel wires.

A second technique consists in making the filamentary reinforcement from a strip of material by winding the material helically on a mandrel so as to produce continuous reinforcement. Such a strip is special in that it has one longitudinal edge that is longer than the other. It is thus possible to obtain a multilayer wall with each layer extending from the inside surface of the reinforcement to the outside surface thereof.

In another embodiment, the wall of the casing is constituted by a plurality of sleeves 3. The sleeves may be made in several different ways. For example, each of the sleeves may essentially comprise circumferential filamentary windings 4 woven with longitudinal threads 5 as shown in FIGS. 3. It is also possible to weave such sleeves conventionally or to make them by adhesively superposing a plurality of sheets of threads that are appropriately oriented relative to the longitudinal axis of the preform. It is also be possible to braid such sheets or to weave them as a tubular sock. The thread which may be a glass fiber thread or a metal wire thread, for example, and the way in which it is made up should be chosen so that the sleeves 3 are practically inextensible, e.g. under the effect of internal pressure. The wall comprises a plurality of sleeves threaded in one another, with each sleeve having a peripheral size that is slightly greater than and/or slightly less than the size of each adjacent sleeve.

The set of sleeves is received between an inside envelope 6 and an outside envelope 7 that are flexible and waterproof and that define the thickness of the wall of the casing.

Figure 1B:
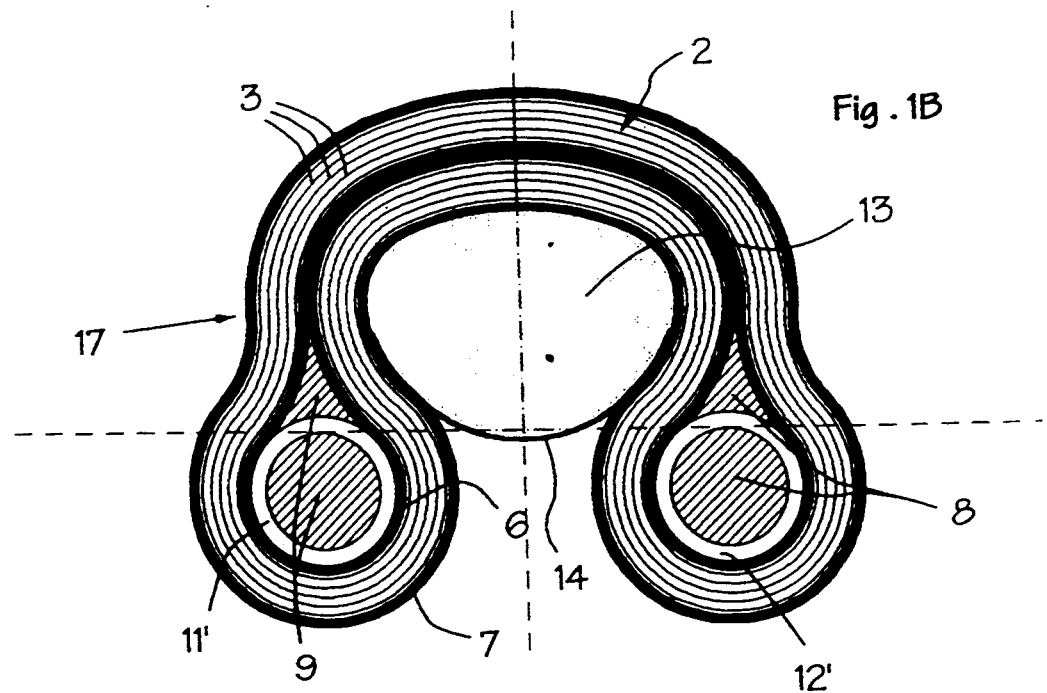
FIG. 1B is a diagrammatic cross-section through a larger section of plastic sealant.

Within these envelopes, the filamentary sleeves are impregnated with a matrix of the kind constituted by a polymerizable or a thermosetting resin of conventional materials, such that it remains fluid at ambient temperature so that the wall of the preform can be folded and placed in one of its folded states as shown in the center of FIG. 1A, in FIG. 1B, and in FIG. 2. During said folding, and during any subsequent unfolding, the sleeves can slide peripherally over one another because the resin with which they are impregnated is still fluid.

At least two types of folding can be performed: horseshoe folding 17 as shown in FIGS. 1A and 1B; and flat folding 15 as shown in FIG. 2. In the case shown in FIGS. 1A and 1B, the folding is specific to a casing application in which the radial dimensions of the folded preform are less than its inside diameter when in the unfolded state. The flat folding 15 rolled up on a drum 16 as shown in FIG. 2 relates to a preform for making pipework, with the flat surface providing minimum resistance to bending in its thin direction.

Two radius of curvature limiters or shapers 8 and 9 are received inside the tube at locations where the wall of the tube is folded back onto itself around hairpin bends. The purpose of these shapers is to limit the radius of curvature in locations where the wall of the preform is folded back onto itself. The material used for these shapers is of a type that is semi-solid at ordinary temperature. In preferred embodiments of the invention, each shaper is enclosed in a flexible sheath 11, and 12 whose function during filling is explained below (FIG. 1A) or it is constituted by tubular ducts 11' and 12' (FIG. 1B) which are optionally filled with semi-solid material which also serves as ballast. The material used becomes fluid under the effect of an increase in temperature such that it can be removed by a flow of fluid when a flow is established inside the preform during filling thereof, or, optionally, when cement is made to flow.

During flattening and folding of the preform, the air that was inside it is expelled, and the vacuum created in this way constitutes means for holding the wall in its folded state. The points referenced A and B in FIG. 1A show how the sleeves slide relative to one another when the tube passes from its folded state to its cylindrical state.

In the case shown in FIGS. 1A and 1B, the preform is not only flattened, but is also curved so that its two hairpin bend ends are brought fairly close to each other, thereby defining a volume of some size between the branches of the horseshoe shape. A kind of sausage 13 of semi-solid material is placed between the branches of the horseshoe shape, thereby making it possible to provide watertight binding between the outside wall of the casing and the terrain it passes through. This material may also be of the polymerizable type, or of the thermosetting type, while remaining plastic at ordinary temperature and becoming fluid at a higher temperature when the preform is put into its cylindrical state (which higher temperature may be the temperature of the borehole or the temperature of the fluid used for filling the casing). It is also possible to provide a material that retains a certain amount of residual elasticity when in its final state whereby the join between the casing and the terrain is improved.

The wall of the tube of the invention finally includes a stretchable outside skin 14. This skin surrounds the tube in its folded state together with the sealant housed between the branches of the horseshoe shape, and its peripheral size is substantially equal to the outside size of the casing. When the preform is in its cylindrical state, the skin 14 fits over the outline of the terrain, as shown in FIG. 1, and the sealant 13 completely fills the residual volume that remains between the outside surface of the tube and the hole bored through the terrain.

In FIGS. 3A and 3B, in addition to the items described above, there can be seen a core 18 inside the wall of the casing, which core is constituted by a flexible foil that stands up well to transverse compression so as to increase the second moment of area of the wall, or else, for the purpose of making the casing heavier while still allowing it to be folded, it comprises a laminated structure of thin foils that are wound on one another and impregnated with resin.

There is ample explanation above that one of the characteristics of the invention results from the capstan effect due to the friction between the circumferentially-oriented fibers when the preform is inflated. When the invention is applied to lining existing pipework, for the purpose of replacing the pipework at locations where it is missing, inflating the preform must cause the preform to be pressed against the existing pipework before the capstan effect is allowed to take place. Under circumstances, the circumferential fibers subjected to external retention of the tube 2' to be lined and to the force of the internal inflation pressure tend to undulate slightly in the longitudinal direction of the preform as shown at 4' in FIG. 3B, thereby slightly increasing the thickness of the preform. The lining is thus a little thicker in regions where it presses against a tube than it is in regions where it replaces the tube. It can thus be seen that the thick structure of the invention lends itself very well to repairing tubes, and better than apparatus designed exclusively for internal lining since such apparatus cannot replace the missing portions of a tube. Finally, the ability of the circumferential fibers to take up excess length due to a smaller diameter than that of the preform after inflation merely by undulating allows the preform to conform to tubes to be repaired having a range of diameters due to slack manufacturing tolerances.

FIG. 4 is a section through a folded tubular preform of the invention while being lowered down a borehole 1. Bands 30 are disposed around the folded preform along its length. It is thus ensured that the preform is filled from the bottom upwards since fluid is injected via the bottom end of the preform and as filling takes place to bands 30 are broken in turn since their breaking strength is designed for this purpose. In FIG. 5, the section is kept in its cylindrical state and in addition to the wall 3, it comprises two end walls 19 and 20 which close the inside volume of said tubular section. The top end wall 19 is connected to the wall by conventional means, in particular such as described in French patent application No. 90 08474 filed Jul. 4, 1990, and it has a duct 21 passing in sealed manner therethrough whereby a filler fluid can be injected into the tubular section. The duct 21 is connected to the two pipes 11 and 12 which contain the material 8 and 9 for limiting the radius of curvature.

The bottom end wall is connected to the tubular wall 3 via a protective sleeve 22 and it is also secured to the bottom portions of the pipes 11 and 12 in order to enable it to be recovered.

It may be observed in FIG. 5 that the bottom end 3a of the wall 3 has inside and outside diameters that are slightly larger than over the remainder of its length. In addition, the top portion 3b thereof is of slightly smaller thickness than the normal section of the wall so that its outside diameter is equal to the inside diameter of the bottom end 3a of the preceding section of casing, and so that its inside diameter is equal to the inside diameter of the normal section. Successive sections can thus overlap with the top end of one bearing, on filling, against the inside surface of the bottom end of the previously installed section which is now rigid. Naturally, the borehole that is designed to receive such casing includes an end which is drilled using a hole opener or reamer to enable said enlarged portion of the casing to expand when the casing is filled.

The above-described sleeve 22 is intended to protect said bottom contact surface when drilling continues after a preceding section has been cased against abrasion and shock from the drilling tool (see FIG. 5). This sleeve may be removable, i.e. it does not set like the wall 3 and since it remains flexible to some extent and is capable of being Grasped by its bottom end and pulled up through the inside of the casing 3 prior to the following section of casing being lowered.

FIG. 5 shows that a section of casing is made from a plurality of lengths put end to end by means of joints 23. This embodiment makes it possible to adjust the length of the casing to the length required on site and it facilitates manufacture and hydraulic testing of sections of casing.

It may also be observed that it is possible to adjust the quantity of sealant as a function in particular of the nature of the terrain drilled through, by adjusting the section of the sausage installed in the hollow of the folded preform (rock drilled to the outside diameter of the casing will require relatively little sealant, whereas softer terrain which is subjected to erosion during drilling will require more).

A section of drilled borehole is thus cased by lowering a length of casing down the borehole while the casing is in its folded state. Once put into place in this way, heat due to the temperature of the surrounding terrain or due to a flow of hot fluid causes the material 8 and 9 in the radius of curvature limiters to become fluid. This material can then be expelled into the inside of the casing under drive from fluid injected via the duct 21. The casing thus begins to fill and take up its cylindrical state. The sausage 13 of sealant is compressed between the wall 3 and the borehole 1 and is thus pushed back circumferentially to fill up the interstices between the borehole drilled through the terrain and the outside wall of the casing. The casing is thus pressed progressively against the inside wall of the borehole starting at the bottom and moving upwards, and its top end is pressed against the inside surface of the preceding section of casing. If there is any excess sealant, it is squeezed into the preceding casing. Thereafter the wall 3 is caused to set, e.g. by circulating a hot fluid at an appropriate temperature (or by waiting for setting to occur naturally over a period of time because of the downhole temperature or because of any other conventional means), after which the top end wall 19, the pipes 11 and 12, and the bottom end wall are removed by withdrawing the duct 21. The protective sleeve 22 remains in place. It is then possible to drill the next section of the borehole.

FIGS. 6 and 7 show an alternative embodiment of the invention. Unlike the preceding examples, instead of making the casing using casing of a single diameter, which requires connection zones to be made by performing drilling operations with a reamer having two different diameters, the casing is performed in the manner that is conventional for lengths of steel casing, by drilling successive lengths of borehole at different diameters without reaming, and casing each length with casing that is likewise of a different diameter (e.g. casing tubes 24 and 25 of FIGS. 6 and 7). For example, under such circumstances, it is possible for a final diameter of 7" (178 mm) to replace a program of steel casing having diameters 20", 13⅜", 9⅝", and 7" (510 mm, 340 mm, 245 mm, and 178 mm) with a program of casing of the invention having diameters 10", 9", 8", and 7" (255 mm, 229 mm, 203 mm, and 178 mm), with the thickness of each casing wall being ¼". Because of the invention, there is no longer any need to leave an annular space for a flow of cement around the casing. This casing capable of being lowered while in the folded state may have an outside diameter that is equal to the inside diameter of the preceding casing. This makes it possible to omit enlarged regions. In addition, the length of the casing and the installation position are no longer as critical as before since the amount of overlap can be chosen freely.

FIG. 6 shows that each section of casing 25 of a given diameter is in fact greatly simplified. To enable it to be filled and passed to the cylindrical state starting from the bottom and moving upwards, a liquid 26 of density greater than the liquid filling the borehole is injected via the tube 27 which constitutes one of the curvature limiters. The other curvature limiter is constituted by a pipe 28 that allows circulation to take place along the well.

FIG. 7 shows the section of casing during the stage of testing the bottom shoe after the top end wall has been removed together with the tube 21, i.e. after the wall has set.

The preform of the invention may also be used for making up another apparatus for casing a borehole that is slightly different from that described above and that is implemented by a method that is also different.

Figure 8:
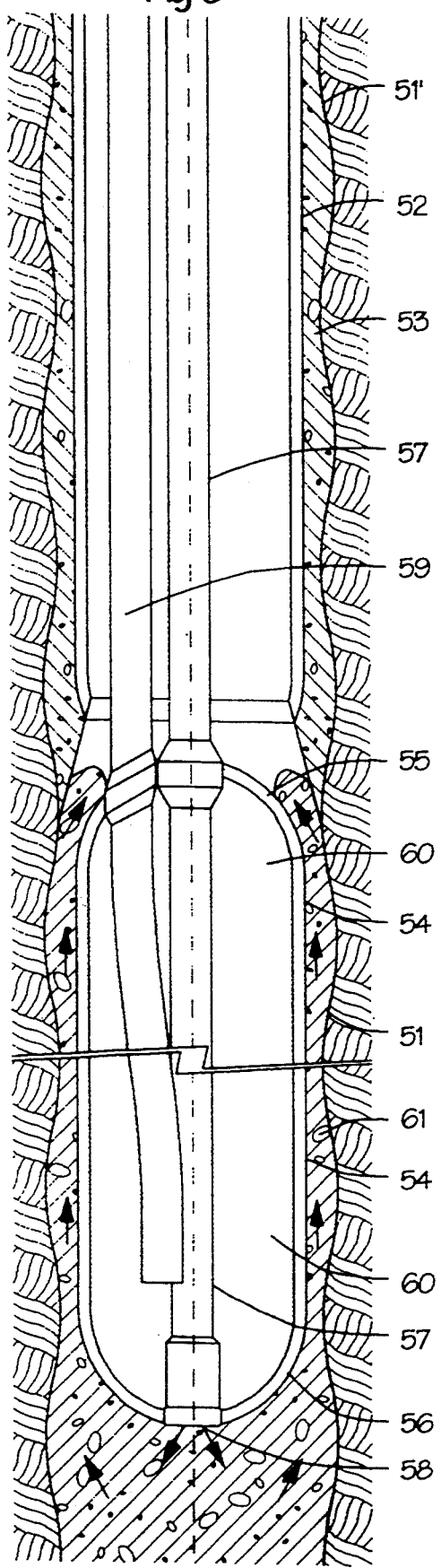
FIG. 8 is a diagrammatic vertical section through a borehole showing the preform of the invention as filled after it has been lowered down the borehole below the preceding length of casing.

In FIG. 8, a borehole 51 is drilled through preceding casing 52 which is cemented to the previous borehole 51' by cement 53. The preceding casing 52 may either be conventional steel casing if it is the first casing, or it may be casing of the invention. Steel casing is constituted by tubular lengths that are about 12 meters long and of constant diameter and that are assembled together by screw connectors to form casing of the desired length. The section of casing 54 of the invention is closed at its top end or head 55 and at its bottom end 56 and it is lowered down the borehole by means of a circulation duct 57 which includes an open bottom end 58 passing through the bottom end wall of the tubing 56. An inflation duct 59 is connected to the head 55 of said length of tubing 54.

In a variant embodiment (not shown) the inflation pipework is connected as a branch on the circulation duct. This branch is preferably connected to the circulation duct in its portion inside the section of casing 54 or in the immediate (outside) vicinity of the head of the section of tubing by means of a branch coupling sleeve opening the branch and simultaneously closing the circulation duct, or closing the branch and keeping the duct 57 open. The duct 57 is consequently selectively connected to a source of inflation liquid or to a source of sealant fluid depending on whether the casing is to be inflated or cemented.

Figure 9:
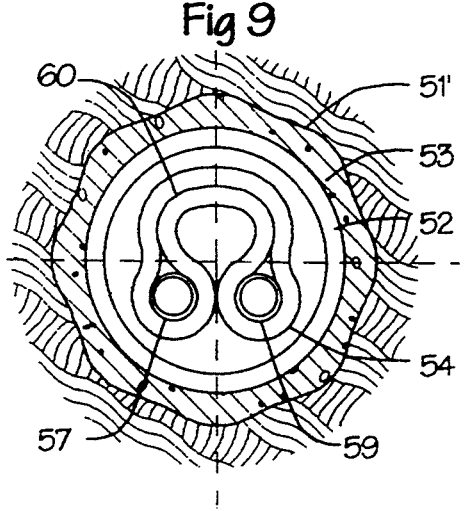
FIG. 9 is a diagrammatic cross-section through the borehole showing the longitudinally folded apparatus while under a vacuum having a generally oval shape and while being lowered through previously cemented casing.

In FIG. 9, the section of tubing 54 is shown in a first state, with its inside volume 60 being evacuated, such that the radial dimension of this section of casing 54 is less than the inside diameter of the preceding casing 52, i.e. less than the inside diameter of the casing 54 of the invention when in its second state of maximum radial size after its inside volume 60 has been filled. When the section of casing 54 has reached its installation position (i.e. when its top end 55 is situated beneath the bottom end of the preceding casing 52), the volume 60 is inflated by being filled via the inflation pipework 59 which is connected to a source of liquid under pressure (not shown).

Figure 10:
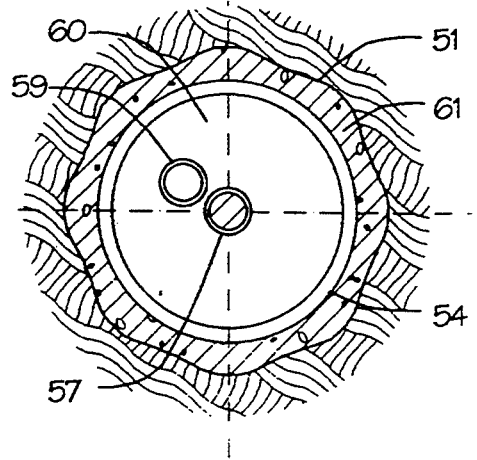
FIG. 10 is a diagrammatic cross-section through the borehole shown in FIG. 8.

FIG. 10 shows the section of casing 54 in section while it is in its second state, i.e. when inflated. Its outside diameter is greater than the inside diameter of the preceding casing 52. At this moment, a cement slurry is injected through the circulation duct 57 and it fills the annular gap 61 between the casing and the borehole.

Figure 11:
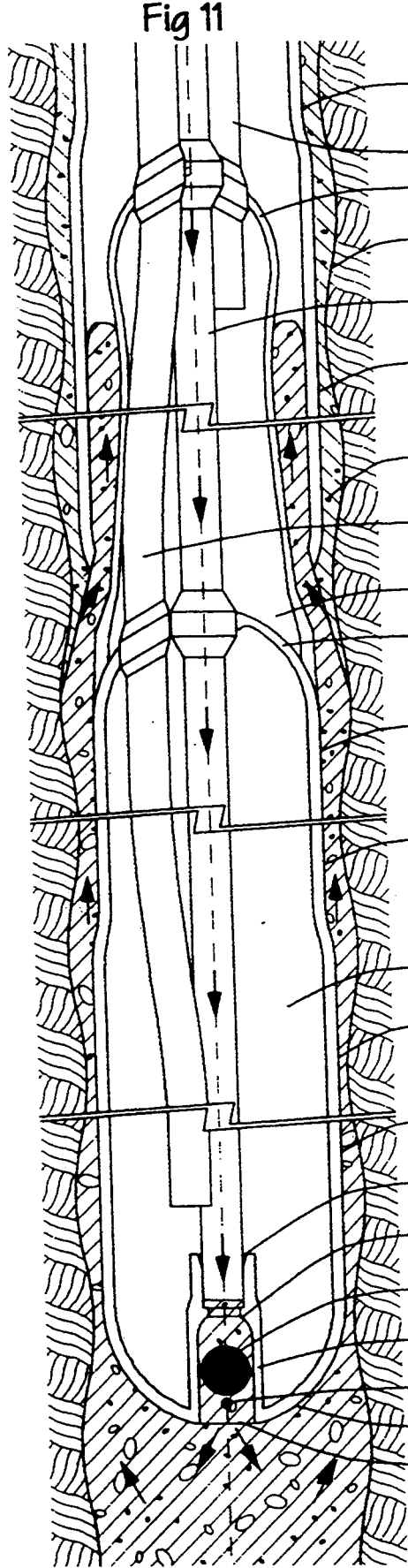
FIG. 11 is a diagrammatic vertical section through a borehole showing a length of casing having two separate and unequal volumes, the shorter volume still being in the folded state.
Figure 12:
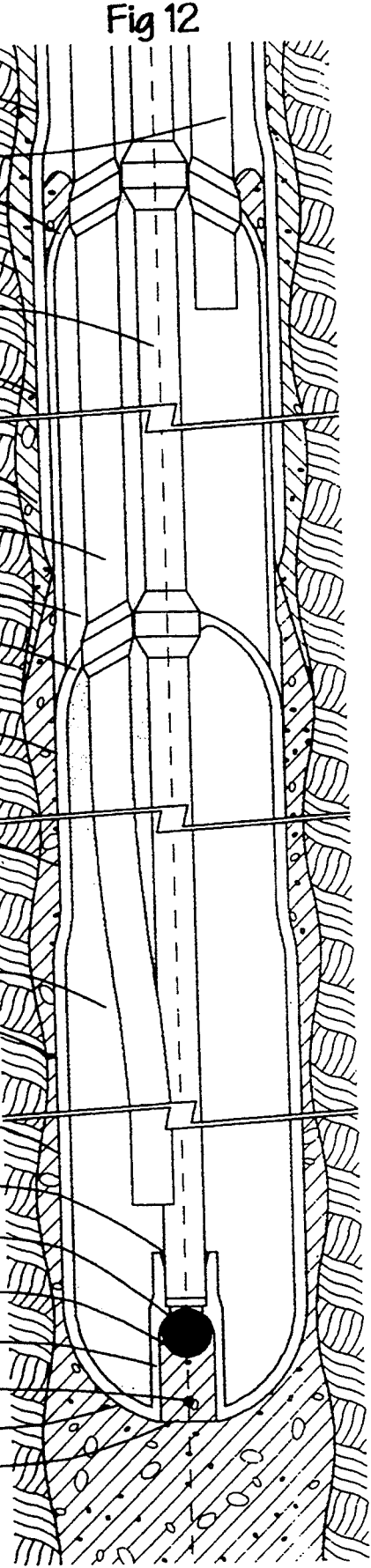
FIG. 12 is a diagrammatic vertical section through the borehole of FIG. 11 after the shorter volume has been filled.

In FIGS. 11 and 12, there can be seen an advantageous variant embodiment of the invention in which the section of casing includes an internal diaphragm 63 splitting its inside volume into two volumes: a long lower main volume 64 and a short upper small volume 65. The two volumes have independent inflation ducts 66 and 67. The bottom portion 18 of the wall of the section of casing delimiting the volume 14 is of larger diameter than the remainder of said wall over a length which is substantially identical to the height of the shorter volume 65. The open bottom end 58 of the flow duct 57 includes a non-return valve 69 having a ball 70 which rests against a seat situated at the top of the valve body 71 and which is retained by a transverse bar 72, with all of the components 56, 69, 70, 71, and 72 being made of drillable material. Immediately above the valve 69, the flow duct 57 includes a zone of weakness 74 for facilitating breakage thereof by traction after the cement has set.

FIG. 11 shows the casing during cementing. Only the longer main volume 64 of the casing has been filled (is in its second state). FIG. 12 shows the casing after cementing has been completed, but before the cement has set, with the smaller volume 65 then being filled and put under pressure to press firmly against the enlarged bottom portion 73 of the preceding casing 52 (which corresponds to the portion 68 of the casing 54 of the invention).

To implement apparatus of the invention, sections of casing 54 are stored in their first stage folded around a vacuum about the circulation duct 57 and on a reel. To avoid having radiuses of curvature that are too small, barium hydroxide or the equivalent is injected into the casing while it is being evacuated. The barium hydroxide also serves to make the folded casing heavy so as to combat buoyancy thrust while it is being lowered through drilling mud in the borehole. The borehole is prepared for casing and the folded flexible casing is lowered through the previously cemented casing 52.

In FIG. 8, the section of casing 54 is located entirely beneath the preceding casing 52.

In FIGS. 11 and 12, the section of flexible casing ceases to be lowered when the shorter top volume 65 is situated level with the enlarged bottom portion 68 or 73 of the preceding casing. To obtain this arrangement, it is naturally necessary to take the precaution of inserting the casing so that the volume 65 is at the top thereof. The main volume 64 is then filled so that it passes from its folded first state to its inflated second state in which it takes up a rigid cylindrical configuration, and this is done using mud of identical density to the mud in the well to ensure that the section of casing does not float. Thereafter a cement slurry is delivered via the duct 57 so as to rise in the annular space 61 between the borehole and the outside of the casing. When the slurry reaches the annular gap between the two sections of casing 52 and 65, the shorter length volume 65 is filled with mud and put under pressure. The wall of this volume is thus pressed firmly against the inside surface of the bottom end of the preceding casing, thereby providing autoclaves sealing. Once the cement has set, the duct 57 is withdrawn by traction, thereby breaking it in the zone 74 and by increasing the inflation pressure in the volumes 64 and 65 so as to break the weaker portions of their walls, i.e. the ends 55 and 75, and the diaphragm 63. Drilling can then continue using a tool of the same diameter.

A numerically-worked example of an implementation of the invention follows. The borehole may begun directly by drilling at a diameter of 8½" (216 mm) for a final passage of about 6" (152 mm). The filled outside diameter of a section of casing is then 7" (178 mm), but its radial section after it has been folded longitudinally under a vacuum is egg-shaped being approximately 5⅜" (136 mm) long in one direction and 4¼" (108 mm) wide in the other direction. The section of casing includes an internal circulation duct having a diameter of 2" (51 mm) as part of a high pressure hose line capable of withstanding the outside pressure at which the casing is filled. The entire section of casing can then be stored on a drum which may contain as much as 1,800 meters on a drum that is 4.2 meters in diameter and 2.5 meters long.

The above description relates essentially to an application of the invention to casing boreholes in the oil industry. In that application as in the application of repairing pipework, it may be advantageous to eliminate the outer envelope of the preform. Impregnation resins are available that give sufficient coherence to the filamentary reinforcement for the outer skin to be pointless.

The embodiments described above are given purely by way of non-limiting example, and other embodiments could be envisaged without going beyond the ambit of the invention.

I claim:

1. A tubular preform that is radially deformable between a longitudinally folded state and a substantially cylindrical unfolded state to form a length of rigid tube in situ, wherein the preform comprises a flexible and watertight inner envelope whose peripheral extent is equal to the internal extent of the length of tube, and, formed on the outside of said inner envelope, reinforcement made of a structure comprising a plurality of fibers or strips impregnated with a settable resin, including fibers oriented mainly in the peripheral direction of the preform, each of these fibers or strips extending over more than one turn and co-operating with adjacent fibers or strips by making contact therewith such that adjacent fibers or strips can slide over one another while the preform is in any state other than its unfolded state where, under internal pressure, the fibers or strips are locked together by the friction between them due to a capstan effect.

2. A preform according to claim 1, wherein said structure is constituted by winding a plurality of long fibers impregnated with settable resin onto the inner envelope supported by a mandrel and covered with sheets of longitudinal fibers.

3. A preform according to claim 1, wherein said structure is located between a flexible and watertight inner envelope whose peripheral extent is equal to the internal extent of the length of tube, and a flexible and watertight outer envelope whose peripheral size is equal to the outside size of the length of tube.

4. A preform according to claim 3, wherein said structure is constituted by winding a plurality of sheets of long fibers impregnated with settable resin around a mandrel covered with the first envelope to make up a thickness equal to the thickness between the two envelopes.

5. A preform according to claim 3, wherein said structure includes a plurality of concentric sleeves placed one within another, each of the sleeves when under load having a peripheral size that is designed to be slightly larger than the size of the sleeve it surrounds or slightly smaller than the size of the sleeve which surrounds it, thereby forming a compact structure.

6. A preform according to claim 3, including a sheet of longitudinal fibers between the inner envelope and the structure.

7. A preform according to claim 1 wherein the structure is made of a strip of material helically wound on said inner envelope, said strip having two longitudinal edges, one of which being longer that the other, the structure having multiple layers with each layer extending from the inner envelope to the outer surface of the structure.

8. A preform according to claim 3, wherein at least some of the fibers or strips are made of metal.

9. A tubular preform that is radially deformable between a folded state and a substantially cylindrical unfolded state to form a length of rigid tube in situ, wherein the preform comprises a flexible and watertight inner envelope whose peripheral extent is equal to the internal extent of the length of tube, a flexible and watertight outer envelope whose peripheral size is equal to the outside size of the length of tube, and, confined between the two envelopes, reinforcement made of a structure comprising a plurality of fibers or strips impregnated with a settable resin, including fibers oriented mainly in the peripheral direction of the preform, each fiber or strip extending over more than one turn and co-operating with adjacent fibers or strips by making contact therewith such that adjacent fibers or strips can slide over one another while the preform is in any state other than its unfolded state where, under internal pressure, the fibers or strips are locked together by the friction between them due to a capstan effect and wherein, in the folded state, it possesses longitudinal edges forming hairpin bends around respective incompressible volumes limiting the radius of curvature of folding.

10. A preform according to claim 9, wherein each incompressible volume is constituted by flexible ducting filled with an incompressible substance.

11. A tubular preform that is radially deformable between a longitudinally folded state and a substantially cylindrical unfolded state to form a length of rigid tube in situ, wherein the preform comprises a flexible and watertight inner envelope whose peripheral extent is equal to the internal extent of the length of tube, and on the outside of said inner envelope, reinforcement made of a structure comprising a plurality of fibers impregnated with a settable resin, including fibers or strips oriented mainly in the peripheral direction of the preform, each of these peripherally-oriented fibers or strips extending over more than one turn and co-operating with adjacent fibers or strips by making contact therewith such that adjacent fibers or strips can slide over one another while the preform is in any state other than its unfolded state where, under internal pressure, the fibers or strips are locked together by the friction between them due to a capstan effect, with the thickness of the filamentary structure being greater than 5/10-ths of a millimeter.

12. A preform according to claim 9, for casing a borehole having in folded state a horseshoe shape, with the two hairpin bends being adjacent each other, such that the largest transverse dimension of the preform folded in this way is substantially less than the inside diameter of the preform in its unfolded state.

13. A preform according to claim 12, including a plurality of peripheral straps for holding it in the folded state and uniformly distributed along its length, the breaking strength thereof being designed so that they break in succession under the effect of filling pressure moving upwards.

14. A preform according to claim 13, wherein the space inside the horseshoe shape constitutes a housing for a material to be used in sealing the wall of the tube as provided by the preform when in its rigid cylindrical state to the wall of the borehole to be cased by said tube.

15. A preform according to claim 13, wherein the preform and the sealing material are contained in an envelope that is breakable or elastic, of peripheral size substantially equal to the outside peripheral size of the preform in its cylindrical state.

16. A preform according to claim 13, including a flexible end wall connected in sealed manner to one end of the tubular wall and a second flexible end wall at the opposite end thereof having the filler duct for the tubular section passing therethrough, which duct is connected to a source of fluid under pressure for causing the preform to pass to a cylindrical state from a folded state in which its inside volume is evacuated and kept under a vacuum.

17. A preform according to claim 13, having one end furthest from its end through which the filler duct passes which has, when in the cylindrical state, an inside diameter equal to the outside diameter of its opposite end, and over portions of substantially equal length.

18. A preform according to claim 16, wherein the filler duct extends inside the preform to the vicinity of the opposite end wall.

19. A preform according to claim 18, wherein the duct is connected to two branches which extend in parallel to each other in each of the volumes filled with incompressible material that limit the above-mentioned folding radius of curvature, their walls being connected at least in part to the bottom end wall of the preform so as to constitute an extractor therefore after the preform has become rigid and the sealant has set.

20. A preform according to claim 8, for forming a length of tube in situ, wherein when in its folded state the preform is in the form of a flap strip.

21. A method of casing a borehole by means of a preform deformable between a longitudinally folded state and a substantially cylindrical unfolded state comprising a flexible and watertight inner envelope and, formed on the outside of said inner envelope, reinforcement made of a structure comprising a plurality of fibers or strips impregnated with a settable resin, including fibers oriented mainly in the peripheral direction of the preform, each of these fibers or strips extending over more than one turn and co-operating with adjacent fibers or strips, said preform including a flexible end wall and a second flexible end wall at the opposite end thereof having a filler duct passing therethrough, which duct is connected to a source of fluid under pressure for causing the preform to pass to a cylindrical state from a folded state wherein the method comprises the following steps:

(a) drilling a portion of borehole to a diameter substantially equal to the outside diameter of the casing;

(b) lowering the folded section of flexible preform inside the borehole and then filling it from the bottom with a fluid under pressure to bring it into its cylindrical state starting from the bottom;

(c) allowing the resin impregnating the structure tensioned by the internal pressure to set and allowing the outer sealant to set;

(d) raising the filler duct; and (e) repeating steps (a) to (d) at a diameter equal to the inside diameter of the previously installed length of casing with the descent of the folded preform being stopped so that its top portion remains received in the previously installed length of casing.

22. A method of casing according to claim 21, by means of said preform having, when in cylindrical state, opposite to the end through which passes the filler duct an end section whose inside diameter is equal to the outside diameter of the other end section, wherein the method comprises the following steps:

(a) drilling a portion of a borehole to a diameter substantially equal to the outside diameter of the previously installed casing with a bottom portion of the borehole being drilled by means of a reamer to a diameter that is slightly greater than said diameter;

(b) lowering the section of flexible preform in its folded state through the previously installed casing and stopping the lowering of said folded preform so that the top portion of the preform remains received in the previously installed portion of casing whose inside diameter is equal to the outside diameter of the top portion of the preform;

(c) filling the preform to bring it from its folded state to its cylindrical state, starting from its bottom end;

(d) allowing the resin impregnating the filamentary structure tensioned by the internal filling pressure to set and also allowing the external sealant to set; and (e) raising the filler duct.

23. A preform for casing a borehole wherein said preform is closed at both ends, possesses in a folded first state a maximum outside radial size that is less than the inside diameter it achieves when in an unfolded tubular second state, and includes at least one circulation duct extending axially inside the preform and passing in sealed manner through its closed ends.

24. A preform according to claim 23, wherein the preform is held folded into a horseshoe shape by a plurality of encircling bands of determined breaking strength.

25. A preform according to claim 24, including means for connecting the inside volume of the preform to a source of fluid to cause the preform to pass by inflation from its first state to its second state, said means being constituted by a separate duct connecting the inside volume of the preform to the source of fluid under pressure.

26. A preform according to claim 24, wherein the connection means is constituted by a branch on the circulation duct and connected thereto via a branch coupling sleeve.

27. A preform according to claim 24, wherein its inside volume is splitted by a diaphragm into two superposed volumes, one of which is short relative to the other.

28. A preform according to claim 27, wherein the longer volume possesses at its end furthest from the other volume, a portion whose length is not less than the length of said other volume and of inside diameter substantially equal to the outside diameter of said other volume when said volumes are in their respective second states.

29. A preform according to claim 28, wherein each of the volumes is fitted with independent means for connection to a source of fluid under pressure.

30. A preform according to claim 27, wherein the ends and the diaphragm are breakable beyond a pressure threshold.

31. A preform according to claim 24, wherein said circulation duct includes a non-return valve preventing fluid from returning towards the source, the non-return valve being made of drillable materials.

32. A preform according to claim 24, wherein the circulation duct includes a disconnection zone situated inside the section of flexible casing and close to one of its ends.

33. A method of casing a borehole using a preform which is closed at both ends, which possesses in a folded first state a maximum outside radial size that is less than the inside diameter achieved when in a tubular unfolded second state and which includes at least one circulation duct extending axially inside said preform and passing in sealed manner through its closed ends wherein the method comprises the following steps:

(a) using a reamer to drill a portion of non-cased borehole having a diameter greater than the inside diameter of the previously installed casing;

(b) lowering a folded section of preform inside the previously installed casing and when the entire length of said folded section of preform is received inside the installed casing, paying out the circulation duct so as to place the section of preform beneath the bottom of the previously installed casing;

(c) causing sealant liquid to flow via the circulation duct so that the liquid rises in the annular gap between the folded section of preform and the wall of the borehole;

(d) filling the section of preform from the bottom with a fluid so as to cause said section of preform to take up its second state;

(e) allowing the preform and the sealant liquid to set, thereby sealing said length of casing; and (f) detaching and raising the circulation duct.

34. A method of casing a borehole using a preform which is closed at both ends, which possesses in a folded first state a maximum outside radial size that is less than the inside diameter achieved when in a tubular unfolded second state and which includes at least one circulation duct extending axially inside said preform and passing in sealed manner through its closed ends, said preform having its inside volume splitted by a diaphragm into two superposed volumes, one of which is short relative to the other, the longer volume possessing at its end furthest from the other volume, a portion whose length is not less than the length of said other volume and of inside diameter substantially equal to the outside diameter of said other volume when said volumes are in their respective second states, wherein the method comprises the following steps:

(a) using a reamer to drill a portion of non-cased borehole to a diameter greater than the inside diameter of the previously installed casing;

(b) lowering the section of preform while in its first state through the previously installed casing so that its short length volume is inserted last;
(c) stopping the descent of the folded section of preform so that its shorter length volume remains received within the previously installed casing;
(d) causing sealant liquid to flow along the circulation duct so that the liquid rises up the annular gap between the portion of the folded section of preform and the wall of the borehole until it reaches the space between the previously installed casing and the shorter volume;
(e) filling the longer volume from the bottom so as to bring it into its second state;
(f) filling the shorter volume so as to bring it into its second state;
(g) allowing the preform and the sealant liquid to set so as to seal the section of casing; and
(h) detaching and raising the circulation duct.

* * * * *